United States Patent [19]
Anand

[11] Patent Number: 6,134,641
[45] Date of Patent: Oct. 17, 2000

[54] METHOD OF AND SYSTEM FOR ALLOWING A COMPUTER SYSTEM TO ACCESS CACHEABLE MEMORY IN A NON-CACHEABLE MANNER

[75] Inventor: Vishal Anand, Fremont, Calif.

[73] Assignee: VSLI Technology, Inc., San Jose, Calif.

[21] Appl. No.: 09/045,469

[22] Filed: Mar. 20, 1998

[51] Int. Cl.[7] .................................................. G06F 12/02
[52] U.S. Cl. .................... 711/202; 709/301; 711/170; 711/173; 711/203
[58] Field of Search .................................... 711/170, 171, 711/172, 173, 203, 204; 709/301

[56] References Cited

U.S. PATENT DOCUMENTS

| | | | |
|---|---|---|---|
| 5,091,850 | 2/1992 | Culley | 395/400 |
| 5,758,050 | 5/1998 | Brady et al. | 714/1 |
| 5,875,466 | 2/1999 | Wakerly | 711/138 |
| 5,911,151 | 6/1999 | Circello et al. | 711/201 |
| 5,930,827 | 7/1999 | Sturges | 711/170 |

OTHER PUBLICATIONS

"Accelerated Graphics Port Interface Specification";Intel Corporation;1996.

*Primary Examiner*—John W. Cabeca
*Assistant Examiner*—Christian P. Chace
*Attorney, Agent, or Firm*—Wagner, Murabito & Hao LLP

[57] ABSTRACT

A method of and a system for allowing cacheable system memory to be accessed in a non-cacheable manner. In one embodiment of the present invention, a computer system is tricked during POST (Power-On Self-Test) to reserve a first region in a non-cacheable address space for a virtual peripheral device. The computer system is then tricked during operating system startup to reserve a second region in a cacheable address space. In the present embodiment, the first region is then mapped to the second region such that accesses to the first region is automatically forwarded to the second region. As a result, objectives of the present invention are achieved as cacheable memory may be accessed via accessing non-cacheable memory of the computer system.

24 Claims, 7 Drawing Sheets

METHOD OF AND SYSTEM FOR ALLOWING A COMPUTER SYSTEM TO ACCESS CACHEABLE MEMORY IN A NON-CACHEABLE MANNER

FIELD OF THE INVENTION

The present invention relates to the field of computer systems. More specifically, the present invention relates to a method of allocating memory in a computer system.

BACKGROUND OF THE INVENTION

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. To this end, the electronics industry has, over time, developed several different high-performance bus architectures. Recently, the Accelerated Graphics Port (AGP), which is an enhancement of the PCI bus architecture, has become widely supported and widely used as the standard interface between graphics adapters and host computers.

The AGP provides significantly improved performance over conventional graphics adapters which utilize local memory, known as local frame buffers (LFBs), as their primary graphics memory. In these conventional graphics adapters, image data are generally stored in system memory. However, image data are not rendered directly from system memory. Rather, image data are first copied to the LFBs and then rendered from the LFBs. Naturally, this method of storing and rendering image data is highly inefficient. For instance, extra instructions have to be executed to copy the image data to the LFBs, and extra memory has to be used to store duplicate copies of the same image data. Complexity of the image data is also severely restricted as the LFBs are usually quite small compared to the system memory. In the fiercely competitive PC-peripherals market, the inefficient use of memory and the performance overhead associated with copying image data to the LFBs significantly undercut the demand of those graphics adapters.

In marked contrast to conventional graphics adapters, AGP-compliant graphics adapters can use both the LFBs and the system memory as primary graphics memory. From the graphics adapter's perspective, both LFBs and system memory are considered logically equivalent, and image data may be allocated in either memory. Particularly, in AGP-compliant graphics adapters, image data stored in system memory are not copied into the LFBs prior to rendering, but are rendered "in place." That is, image data are read and rendered directly from system memory. One major advantage of this method of direct rendering (also known as Direct Memory Execute, or DME) over conventional designs is that the amount of usable primary graphics memory is significantly increased. Another advantage is improved performance as it is no longer necessary to transfer image data to the LFBs prior to rendering.

This direct rendering feature of AGP, however, may not be compatible with most existing operating systems, which treat system memory as cacheable. In these operating systems, instructions and data frequently accessed are copied to and temporarily stored at a high-speed cache memory such that additional accesses to the same instructions and data can be performed very quickly. Ordinarily, caching operations would enhance system performance. However, caching may actually hinder the performance of AGP graphics adapters because cache memory may sometimes be "incoherent" with system memory. That is, the CPU may have modified certain data in the cache memory without updating the system memory. As a results, the copy in the cache may be different from the master copy in the system memory. In other words, the data stored in the system memory have become "stale." Thus, by addressing cacheable system memory directly, the graphics adapter may erroneously render "stale" image data in the system memory.

One solution to the incoherency problem is to "snoop" the cache memory before accessing the system memory. Snooping is a technique used by cache memory controllers to detect an access to the main memory that might cause a cache consistency problem. For instance, before accessing a particular piece of data within the system memory, the cache memory is checked to see whether it contains a more recent copy of that particular piece of data. If the cache memory has a more recent copy, it is written to the system memory. Snooping effectively eliminates the cache coherency problem. However, snooping also introduces significant overhead to the rendering process and substantially hinders the performance of the AGP graphics adapter.

Another solution to the cache coherency problem is to modify the existing operating systems to set aside a particular portion of the system memory as non-cacheable. However, that solution is not feasible as the cost of modifying an existing operating system is prohibitive. More importantly, any modification to the existing operating systems may cause compatibility problems and may introduce unforeseeable software glitches.

Therefore, what is needed is a method of and system for allowing cacheable system memory to be accessed in a non-cacheable manner such that snooping may be avoided. The present invention offers a unique and novel solution whereby extensive modification to the operating systems is unnecessary. The solution offered by the present invention is also relatively inexpensive and may easily be implemented in many of today's computer systems.

SUMMARY OF THE INVENTION

The present invention provides a method of and a system for allowing cacheable system memory to be accessed in a non-cacheable manner. According to one embodiment of the present invention, a computer system is tricked during POST (Power-On Self-Test) to reserve a first region in a noncacheable address space for a virtual peripheral device. The computer system is then tricked during operating system startup to reserve a second region in a cacheable address space. The first region is then mapped to the second region. As a result, objectives of the present invention are achieved as cacheable memory may be accessed via non-cacheable address space of the computer system.

More particularly, in one embodiment of the present invention, the computer system is implemented with means for falsely indicating to configuration software that a virtual peripheral device is actually coupled to a peripheral bus. Tricked by the false indication, the computer system will allot a first range of addresses in a non-cacheable peripheral space to the virtual peripheral device. Thereafter, an operating system, including a device driver written for the virtual peripheral device, is loaded into the computer system. A second range of addresses in a cacheable system memory space will then be allotted to the device driver. Thereafter, the first range of addresses is mapped to the second range of addresses by hardware such that accesses to the first range of addresses will automatically be forwarded to the second range of addresses.

In one embodiment of the present invention, the mapping function is implemented in a host/peripheral bridge of the computer system. Further, in that embodiment of the invention, the host/peripheral bridge additionally includes a set of special configuration registers for falsely indicating to the computer system during POST that the virtual peripheral device physically exists.

In furtherance of one embodiment of the present invention, the computer system may include an accelerated graphics port (AGP) for interfacing with AGP-compliant devices. In this embodiment, the AGP-compliant devices and CPUs are enabled to access the system memory without caching. Consequently, performance-degrading processes, such as snooping are avoided, and overall performance of AGP compliant devices is significantly improved.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

I. Notation and Nomenclature

Some portions of the detailed descriptions which follow are presented in terms of steps, procedures, logic blocks, processing, and other symbolic representations of operations on data bits within a computer memory. These descriptions and representations are the means used by those skilled in the data processing arts to convey the substance of their work most effectively to others skilled in the art. A procedure, logic block, process, step, etc., is here, and generally, conceived to be a self consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "indicating," "allotting," "allocating," "assigning," or the like, refer to the actions and processes of a computer system or similar electronic computing device. The computer system or similar electronic device manipulates and transforms data, represented as physical (electronic) quantities within the computer system's registers and memories, into other data, similarly represented as physical quantities within the computer system memories, into other data similarly represented as physical quantities within the computer system memories or registers or other such information storage, transmission, or display devices.

II. Computer System Environment

Figure 1:
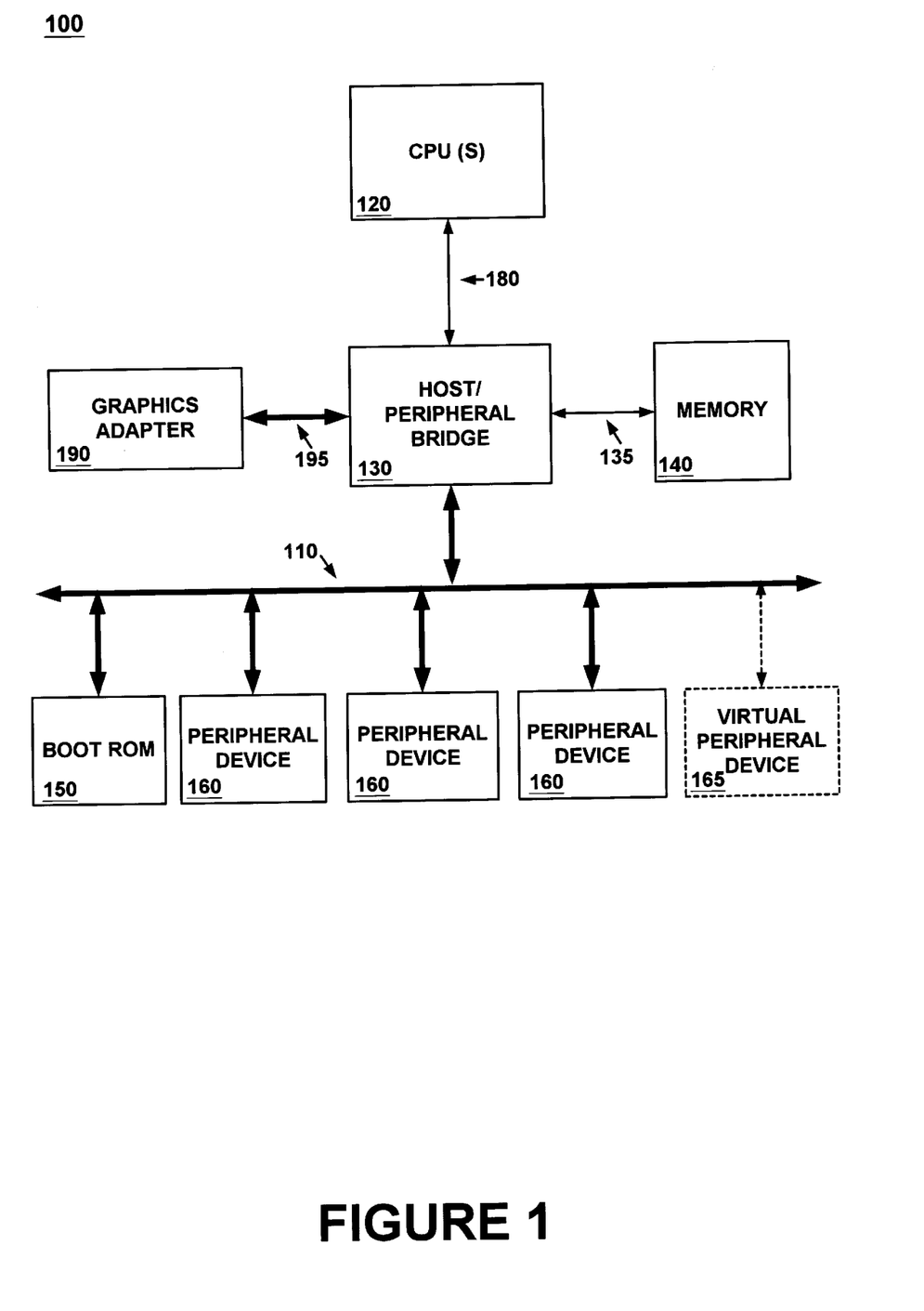
FIG. 1 is an exemplary computer system used in accordance with the present invention.

Specific aspects of the present invention are operable within a programmed computer system. An exemplary computer system operable to implement the elements of the present invention is shown in FIG. 1. As illustrated, computer system 100 includes one or more processors (CPUs) 120 for processing information and instructions, a peripheral bus 110 for communicating information including addresses, data, and control signals, system memory 140 for storing information and instructions for CPU(s) 120, and a host/peripheral bridge 130 for interfacing and coordinating data transfers between CPU(s) 120, system memory 140, and a plurality of peripheral devices 160. Particularly, host/peripheral bridge 130 may be coupled to CPU(s) 120 via a CPU local bus 180 and may be coupled to system memory 140 via a memory bus 135. Peripheral devices 160, including hard disk drives, network adapters, keyboards, cursor control devices, etc., are coupled to host/peripheral bridge 130 via a peripheral bus 110. A dedicated bus 195, such as AGP, may also couple a graphics adapter 190 to host/peripheral bridge 130. Further, in embodiments of the present invention applicable to computer systems using the PCI bus, host/peripheral bridge 130 may comprise a PCI chipset.

Computer system 100 may also include a boot ROM 150 for storing and providing boot-up instructions for CPU(s) 120 when computer system 100 is powered-on or reset. Generally, boot ROM 150 contains program instructions known as BIOS, or POST/BIOS if the program instructions include codes for performing Power-On Self-Test (POST). Boot ROM 150 may also include configuration software for allocating system resources among various devices. For instance, during POST, peripheral devices 160 are scanned, and system resources, such as I/O addresses, are allocated among them. Boot ROMs and POST are well known in the art and, therefore, are not described in detail herein to avoid obscuring aspects of the present invention.

Program instructions executed by the computer system can be stored in RAM, ROM, or in a peripheral device and when executed in a group can be referred to as logic blocks or procedures. Further, within the following discussions of the present invention, program instructions and/or data may reside within computer readable memory units of computer system 100 and are executed and/or read by CPU(s) 120. When executed, the instructions cause the computer system 100 to perform specific behaviors which are described in detail to follow where appropriate. It is also appreciated that computer system 100 of FIG. 1 is exemplary only and that the present invention can be implemented within a number of different computer systems.

III. General Description of the Present Invention

Figure 2:
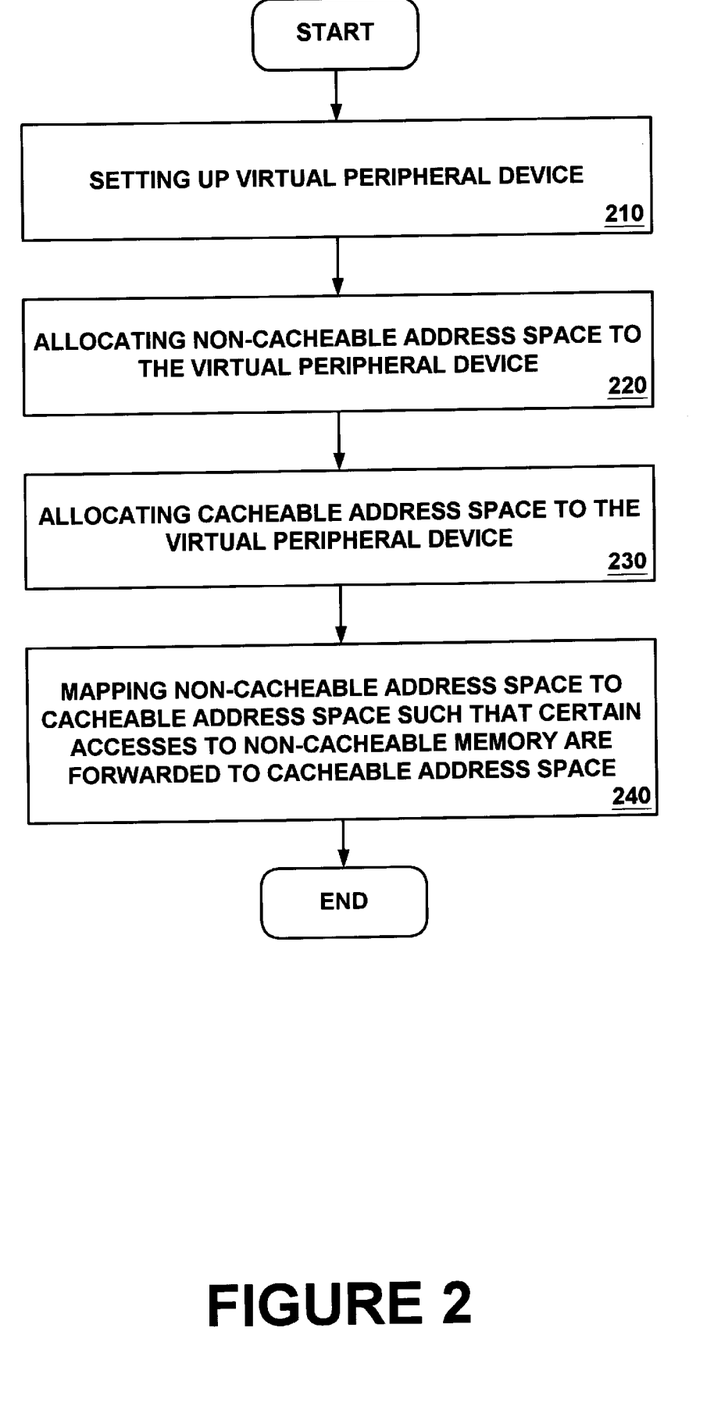
FIG. 2 is a flow diagram illustrating a method of configuring the computer system of FIG. 1 to access cacheable memory in a noncacheable manner according to the present invention.

The present invention provides a method of and a system for allowing a computer system to access cacheable system memory in a non-cacheable manner. One embodiment of the present invention is illustrated in FIG. 2. As shown, the present embodiment may be implemented in essentially four stages. The first stage 210 comprises the step of setting up a virtual peripheral device in the computer system. The second stage 220 comprises the step of allocating a region in the computer system's non-cacheable address space to the virtual peripheral device. The third stage 230 comprises the step of allocating a region in the computer system's cacheable address space for the virtual peripheral device. Lastly, the fourth stage 240 comprises the step of mapping the range of non-cacheable address space to the range of cacheable address space such that accesses to the range of non-cacheable address space are automatically forwarded to corresponding addresses in the cacheable address space. According to one embodiment of the present invention, the first stage 210 and the fourth stage 240 require hardware assistance. Therefore, in order to carry out the first stage 210 and the fourth stage 240, special features are implemented in the hardware of computer system 100. Each of the four stages, as well as the special hardware features, of the present invention will be described in detail in the following.

Stage 1: Setting up a Virtual Peripheral Device

When computer system 100 is powered-on, the first process it performs is typically initialization. For instance, configuration software may scan the peripheral bus to determine what peripheral devices exist and what configuration requirements they may have. This process is commonly referred to as Power-On Self-Test, or POST. The configuration software that performs POST may be stored in boot ROM 150 of computer system 100, and may be executed automatically by CPU 120 whenever the computer system powers on or resets. POST and configuration software are well known in the art, and are generally similar among many different types of computer systems. Therefore, they are not described in detail herein to avoid obscuring aspects of the present invention.

In order to facilitate the POST process, each peripheral device 106 may include a set of configuration registers which contain identity information and other resource allocation information of the corresponding peripheral device. These configuration registers are usually defined by industry standard specifications, such as PCI Local Bus Specification Revision 2.1. In the PCI bus, for example, a peripheral device may be identified by a unique "header," such as manufacturer ID or device ID, in its configuration registers. Having read the configuration registers and determined the identity of the peripheral device, the configuration software then determines the number of address blocks or I/O space the peripheral device requires. Thereafter, the configuration software assigns memory or I/O address ranges that are mutually-exclusive from those assigned to other system devices. Configuration software may also program the peripheral device's memory or I/O decoders to respond to the assigned memory or I/O address ranges.

According to one embodiment of the present invention, a virtual peripheral device is set up by implementing a set of special configuration registers, which does not correspond to any physical peripheral device, within host/peripheral bridge 130 of computer system 100. A virtual peripheral device 165 is illustrated in dotted lines in FIG. 1. During POST, when configuration software scans peripheral bus 110 to determine the presence and identity of peripheral devices 160, the set of special configuration registers will be read and treated as other regular configuration registers that may be present. In this way, the set of special configuration registers falsely indicates to computer system 100 that virtual peripheral device 165 is physically present on peripheral bus 110. In reality, however, virtual peripheral device 165 does not exist, and the special configuration registers essentially set aside an I/O region or a peripheral memory region of the computer system's address space normally used for actual peripheral devices 160.

In one embodiment of the present invention, configuration registers may be hardwired to include a base address of virtual peripheral device 165 and parameters pertaining to the size of the address block that should be set aside of virtual peripheral device 165. Alternately, configuration registers may be writable to allow system resources to be dynamically allocated.

In another embodiment of the present invention, the set of special configuration registers may be implemented in other hardware components which are scanned by configuration software during POST. For instance, the set of special configuration registers may be implemented in graphics adapter 190, in addition to a set of configuration registers that is already present. Further, configuration registers are PCI specific and may not be used in other bus architectures. However, it should be apparent to those of ordinary skill in the art, upon reading the present disclosure, that, in other peripheral bus systems, other means for falsely indicating to the host system of the presence of a peripheral device may be used. Further, in some computer systems, the means for falsely indicating may be implemented in hardware or software.

Stage 2: Resource Allocation During POST

As discussed above with reference to Stage 1, whenever computer system 100 is powered-on, a self-testing and self-initializing process called POST is performed. During POST, configuration software detects and tests the hardware components, especially peripheral devices 160 and system memory 140 of the computer system 100. More importantly, system resources such as I/O addresses and memory addresses are allocated to peripheral devices 160 during the POST process. For instance, a LAN adapter may be assigned a unique address such that when CPU 120 asserts that particular address on CPU local bus 180, the LAN adapter will be selected. In the particular embodiment as illustrated, configuration software used during POST may be stored within boot ROM 150. However, it should be apparent to those ordinarily skilled in the art, upon reading this disclosure, that configuration software may also be stored in other devices, such as a remote server, or in other computer readable media.

Figure 3A:
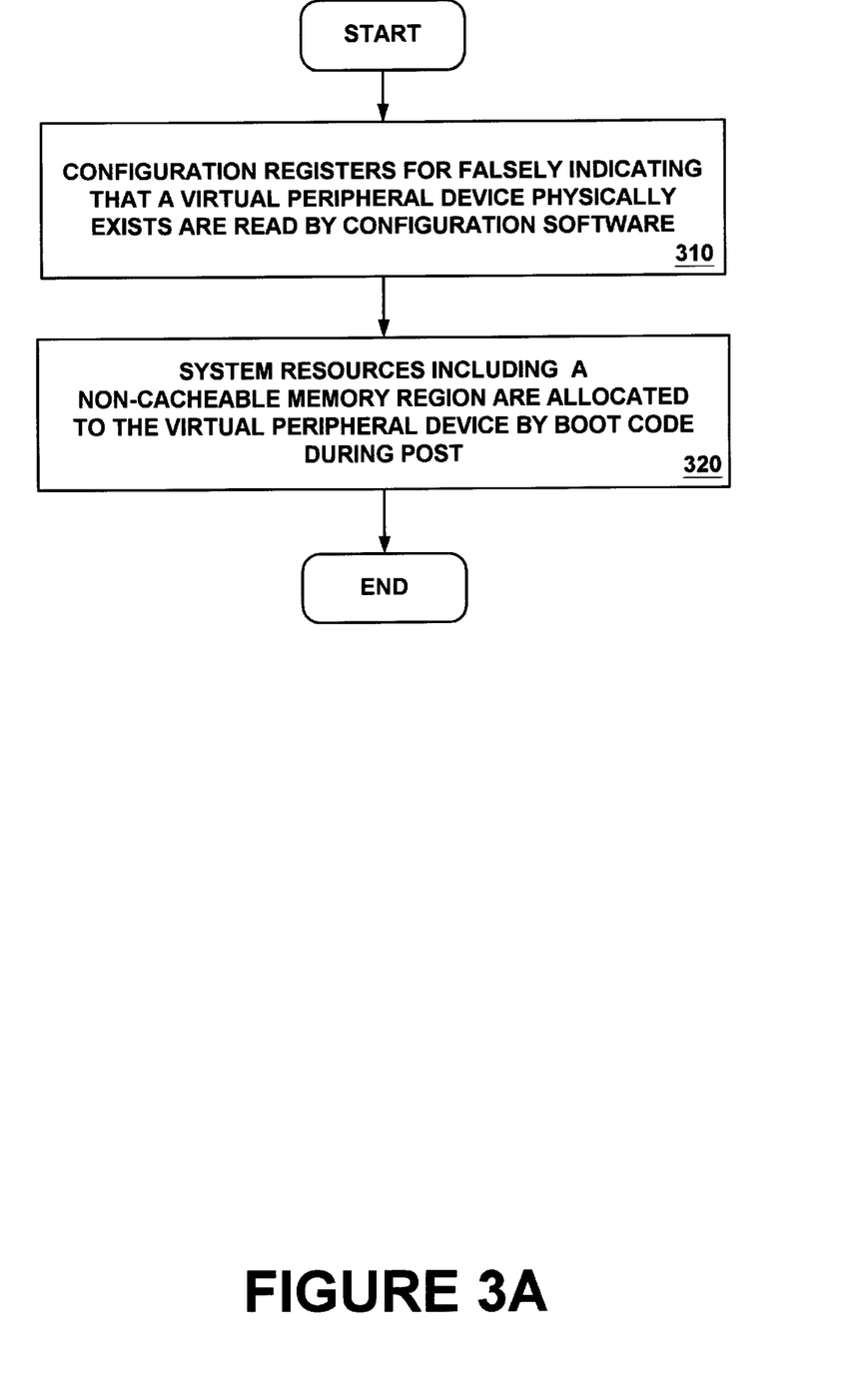
FIG. 3A illustrates a process of allocating resources to a virtual peripheral device according to one embodiment of the present invention.

FIG. 3A illustrates the process of allocating resources to virtual peripheral device 165 according to one embodiment of the present invention. As illustrated, in step 310, a set of special configuration registers provided in host/peripheral bridge 130 of computer system 100 is read by configuration software during POST. Configuration software, which does not have the capability to determine whether actual peripheral devices are associated with the special configuration registers, will acknowledge the presence of virtual peripheral device 165.

In step 320, upon reading the special configuration registers, configuration software will treat the special configuration registers as if they are identifying an actual peripheral device. Consequently, computer system 100 will be tricked to set aside system resources for virtual peripheral device 165 according to the contents of the special configuration registers. Significantly, the special configuration registers include a base address within a non-cacheable peripheral I/O address space such that the I/O addresses assigned to virtual peripheral device 165 will be non-cacheable. In one embodiment, the set of special configuration registers may be hardwired to contain a base address within a peripheral I/O address space such that a non-cacheable address space will be assigned to peripheral device 165. Further, the special configuration may also include parameters for indicating to computer system 100 the number of I/O addresses that should be allocated to virtual peripheral device 165.

Figure 4:
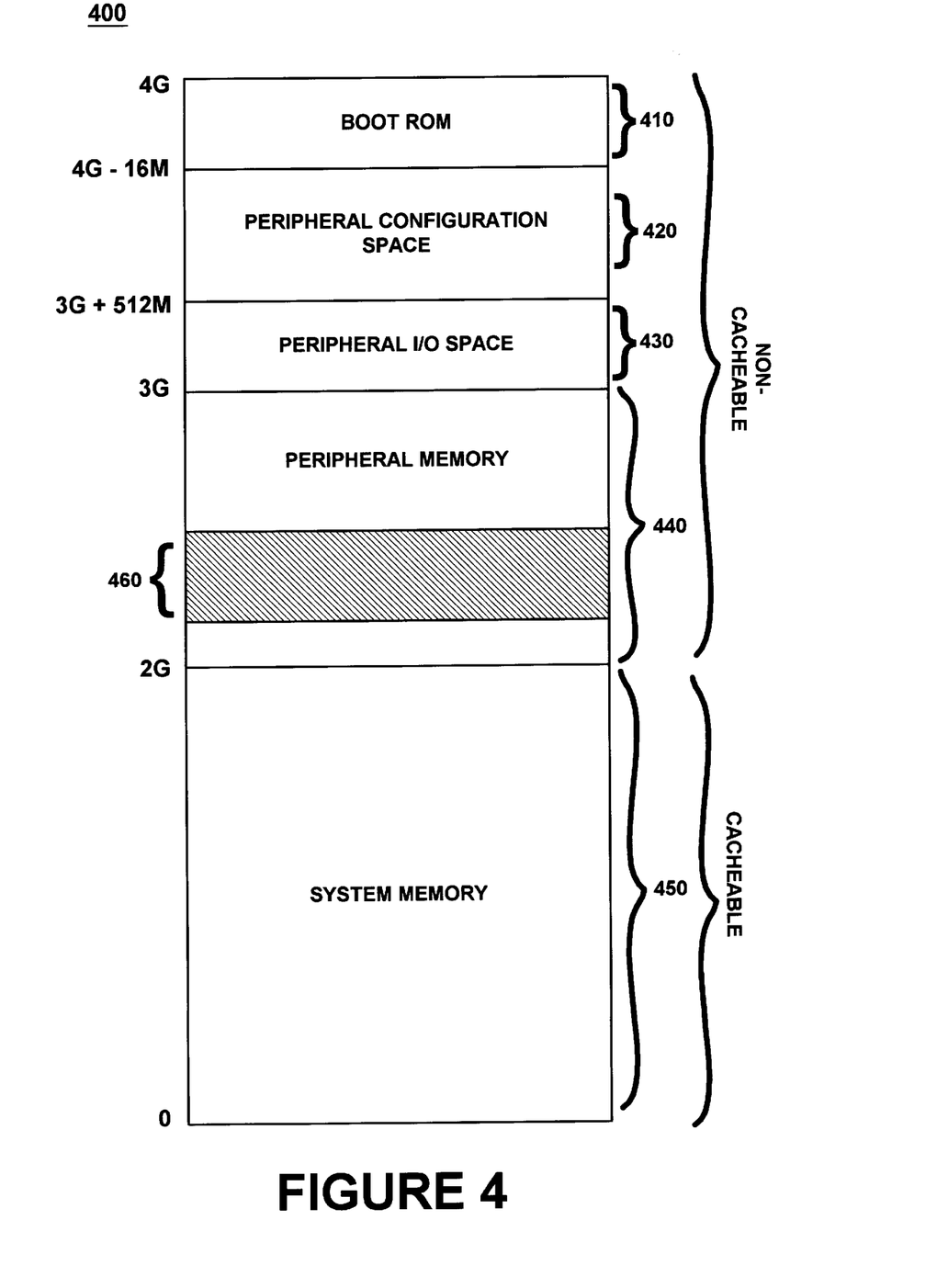
FIG. 4 illustrates an address map which graphically represents a total range of locations addressable by the exemplary computer system shown in FIG. 1 after system resources have been allotted to a virtual peripheral device.

FIG. 4 illustrates an address map 400 which graphically represents the total range of locations addressable by computer system 100. In particular, address map 400 represents a 4 G (4 gigabytes) address space corresponding to a 32-bit addressing scheme. That is, CPU 120 may address up to a maximum number of 4 G of locations including memory addresses for system memory 140 and I/O addresses for peripheral devices 160 and boot ROM 150. In the particularly embodiment as shown, address map 400 is subdivided into a plurality of different regions including a boot ROM region 410, a peripheral configuration space 420, a peripheral I/O space 430, a peripheral memory space 440 and a system memory space 450. Particularly, boot ROM region 410 represents the range of addresses that CPU 120 may assert to address boot ROM 150. Similarly, peripheral configuration space 420 represents the addresses of configuration registers for peripheral devices 160 and the special configuration registers for virtual peripheral device 165. Peripheral I/O space 430 corresponds to the I/O addresses of peripheral devices 160, and peripheral memory space 440 corresponds to memory locations of the peripheral device 160. In addition, system memory space 450 corresponds to memory locations of system memory 140. According to the present embodiment, boot ROM region 410, peripheral configuration space 420, peripheral I/O space 430, and peripheral memory space 440 are treated as non-cacheable by the operating system. System memory space 460, on the other hand, is treated as cacheable by the operating system.

Significantly, FIG. 4 illustrates a "snapshot" of address map 400 after system resources have been allotted to virtual peripheral device 165. According to one embodiment, an address block 460 is allotted to virtual peripheral device 165. In the particular embodiment as illustrated, address block 460 including 4K (4 kilobytes) of address locations has been allocated to virtual peripheral device 165. In the particular embodiment as shown, address block 460 is allocated within peripheral memory space 440, which is treated as non-cacheable by the operating system. Accordingly, address block 460 will not be cached when accessed Stage 3: System Memory Allocation By Device Driver In furtherance of the present invention, after POST is performed, computer system 100 will load an operating system, including a plurality of device drivers for controlling and interfacing with the hardware components of computer system 100, into system memory 140. Device drivers are well known in the art and are, therefore, not described herein so as to avoid obscuring the present invention.

Figure 3B:
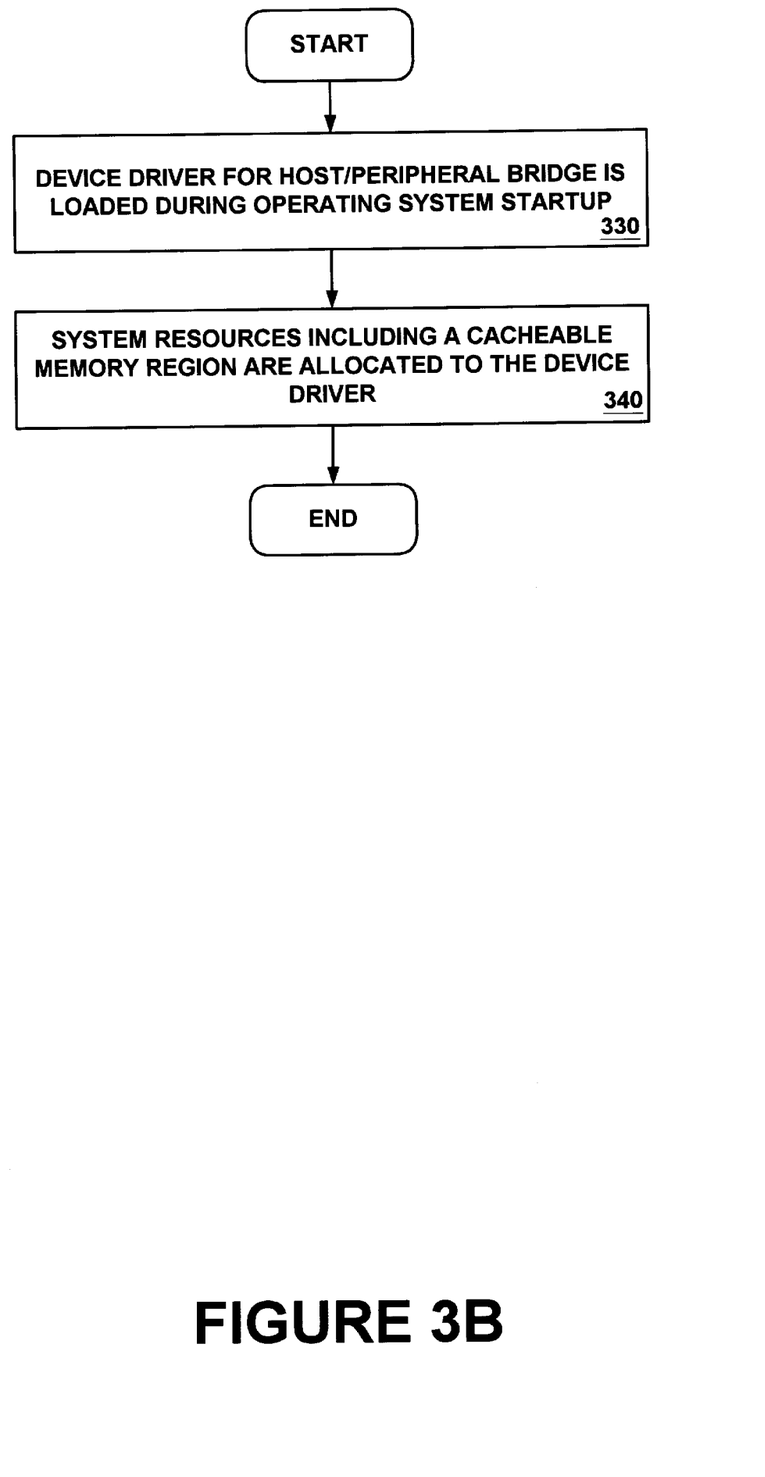
FIG. 3B is a flow diagram of a process of setting aside portions of system memory for a virtual device driver according to one embodiment of the present invention.

FIG. 3B is a flow diagram of the process of setting aside portions of system memory 140 for virtual device driver 165 according to one embodiment of the present invention. As illustrated in step 330, a special device driver written for host/peripheral bridge 130 is loaded into system memory 140. Since virtual peripheral device 165 that does not physically exists, the special device driver does not include any instruction or code for controlling virtual peripheral device 165. Rather, the special device driver is implemented for setting aside a portion of system memory 140. Methods of implementing device drivers are well known in the art. Therefore, a person of ordinary skill in the art of computer programming would be able to implement the special device driver upon reading the present disclosure without undue experimentation.

In step 340, a cacheable address block is allocated to the special device driver by the operating system. According to the present invention, once the cacheable address block is allocated to the special device driver, the cacheable address block will no longer be actively used by the operating system. In other words, the cacheable address block will no longer be directly accessed by CPU 120.

Figure 5:
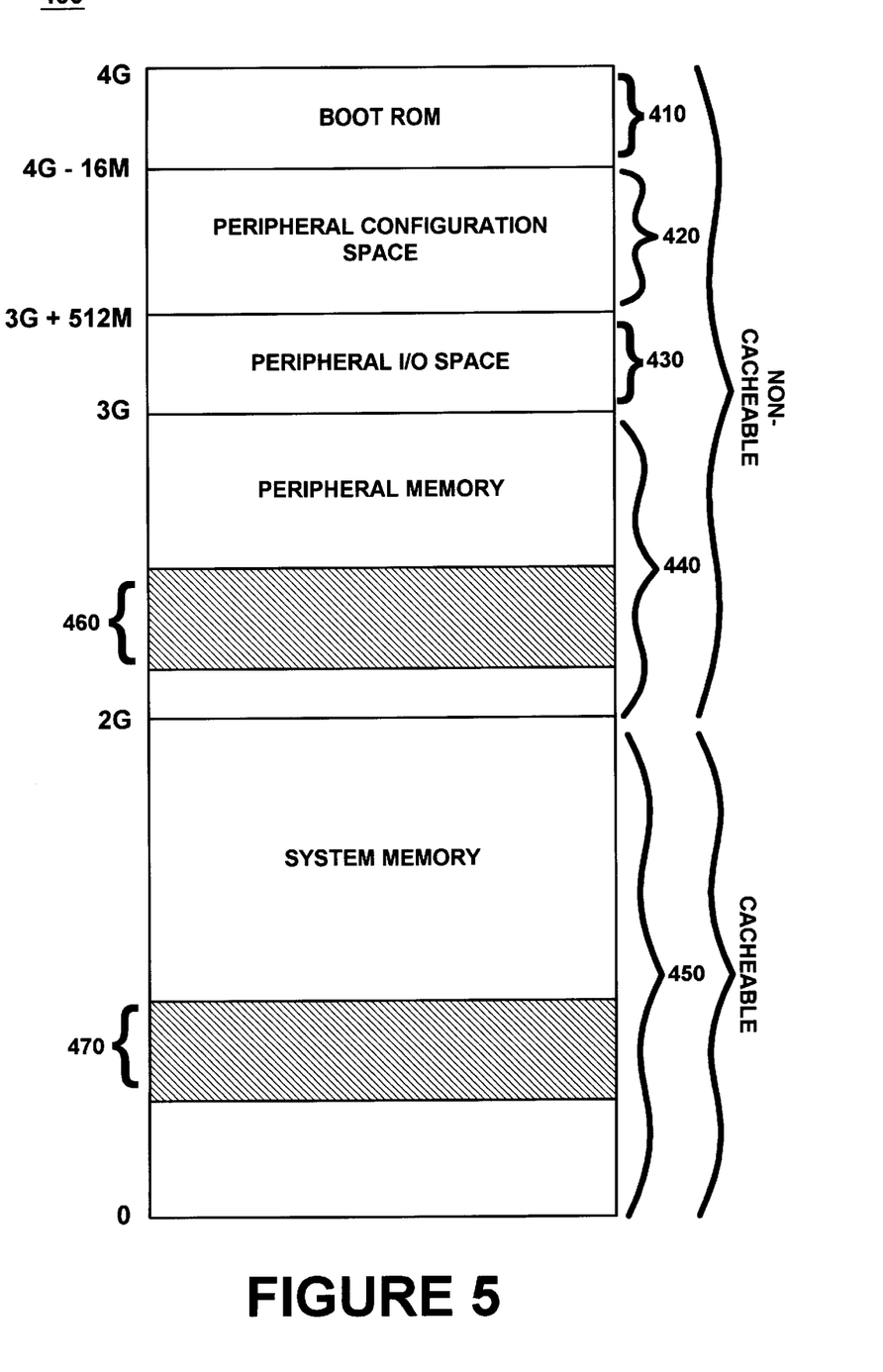
FIG. 5 illustrates the address map of FIG. 4 after an address block in system memory space is allotted to a device driver of the virtual peripheral device.

FIG. 5 illustrates address map 400 of FIG. 4 after an address block 470 is allotted to the special device driver. Significantly, address block 470 is allotted within system memory space 450 of address map 300. According to the present invention, system memory space 450 is treated as cacheable by the operating system. Thus, address block 470 is supposed to be cacheable by the operating system. However, because address block 470 has already been allotted to the special device driver, address block 470 will no longer be directly accessed by CPU 120.

Stage 4: Address Mapping

Figure 6:
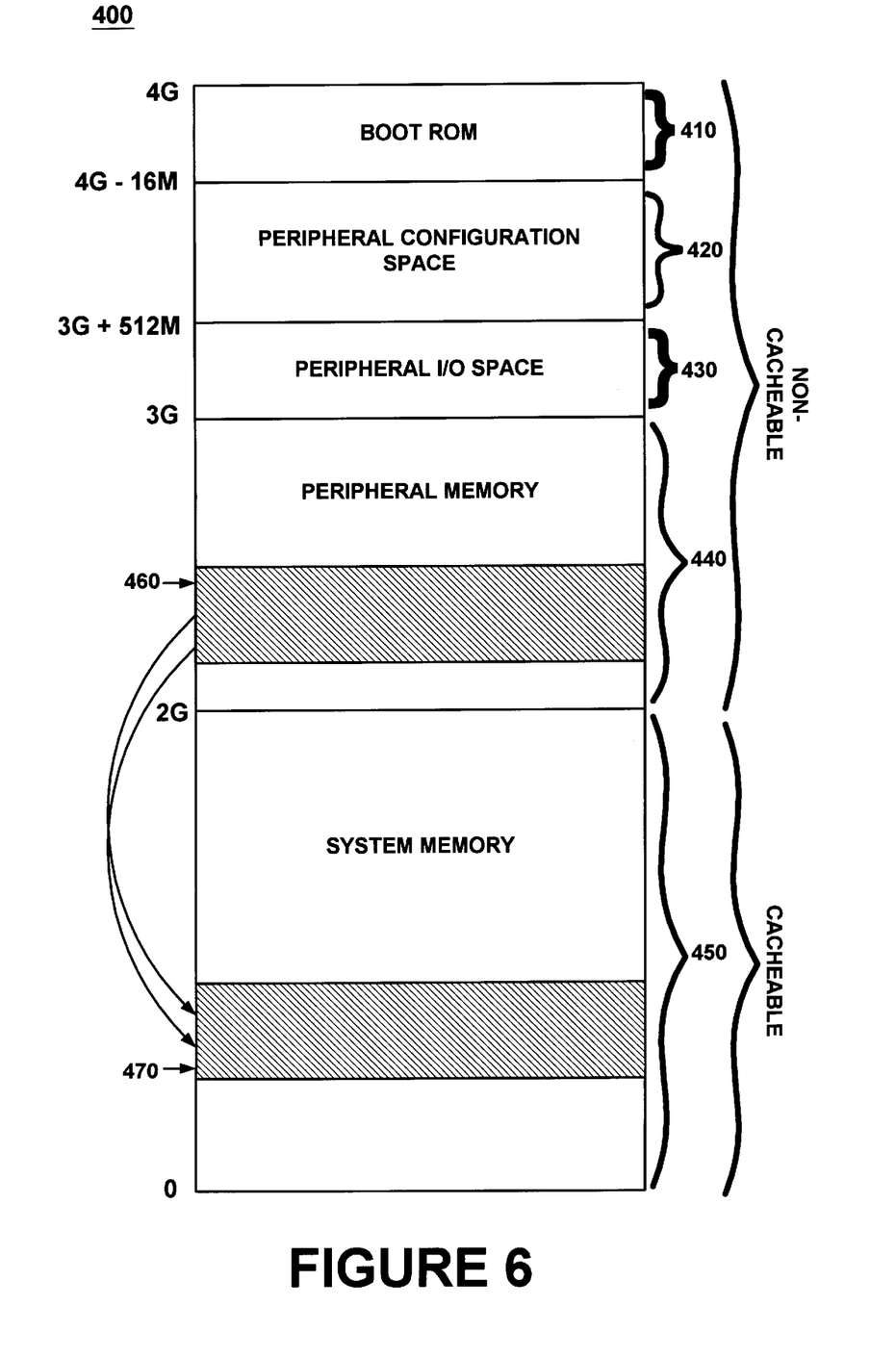
FIG. 6 illustrates the address map of FIG. 4 and FIG. 5 with a range of peripheral addresses mapped to a range of system memory addresses.

In furtherance of the present invention, the non-cacheable address lock 460 allotted in step 320 is mapped to the cacheable address block 470 allotted in step 340. FIG. 6 illustrates address map 400 having address block 460 mapped to address block 470. In the present embodiment, address mapping is achieved by implementing address conversion logic in host/peripheral bridge 130 of the computer system 100. Preferably, address conversion logic in host/peripheral bridge 130 would handle accesses to cacheable address block 470 via non-cacheable address block 460 transparently. For instance, when CPU 120 attempts to access a particular address within non-cacheable address block 460, that particular address is asserted on the CPU local bus 180. Address conversion logic in host/peripheral bridge 130 may then convert that particular address to a corresponding one in the cacheable address block 470 such that system memory 140 will be accessed. In this way, cacheable memory may be accessed in a non-cacheable manner.

A method of and system for allowing cacheable memory to be accessed in a non-cacheable manner has thus been disclosed. By setting up a virtual peripheral device, the present invention results in the creation of a non-cacheable address block in normally cacheable system memory space. Consequently, snooping can be avoided even when the operating system treats the entire system memory as cacheable. Thus, when used with specific peripheral devices such as AGP-graphics adapters, the non-cacheable block of system memory may then be addressed directly by both the graphics adapters and the CPU without any cache coherency problem.

What is claimed is:

1. A method of allocating memory in a computer system, the method comprising the steps of:

(a) indicating to said computer system that a virtual peripheral device is physically coupled to a peripheral bus of said computer system;

(b) allotting a first memory region to said virtual peripheral device, wherein said first memory region is designated to be non-cacheable by an operating system of said computer system;

(c) loading an operating system and a device driver for said virtual peripheral device into said computer system;

(d) causing said operating system to allocate a second memory region to said device driver such that said second memory region is unaddressable by a processor unit of said computer system and wherein said second memory region is designated to be cacheable by said operating system; and (e) mapping said first memory region to said second memory region, wherein memory accesses to said first memory region are forwarded to said second memory region such that cacheable memory is accessed by said computer system in a non-cacheable manner.

2. The method according to claim 1 wherein step (a) further comprises the step of:

(f) reading a set of configuration registers of said computer system, said set of configuration registers for indicating to said computer system that said virtual peripheral device physically exists.

3. The method according to claim 2 wherein said set of configuration registers include a base address for defining said first memory region.

4. The method according to claim 2 wherein step (f) is performed during power-on-self-test of said computer system.

5. The method according to claim 2 wherein said set of configuration registers are implemented in a controller hardware of said computer system.

6. The method according to claim 5 wherein said controller hardware comprises a host/peripheral bridge.

7. The method according to claim 1 wherein said second memory region is accessible by a peripheral device.

8. The method according to claim 7 wherein said peripheral device is an AGP-compliant device.

9. The method according to claim 1 wherein said peripheral bus is a PCI bus.

10. The method according to claim 9 wherein said first memory region is allocated within a PCI memory region.

11. The method according to claim 9 wherein said second memory region is within a cacheable system memory region.

12. In a computer system, a method of allocating memory for use by a processor unit and a peripheral device, said method comprising the steps of:

(a) causing said computer system to allot a first address to a virtual device, wherein said first address is within a non-cacheable address space of said computer system;

(b) causing said computer system to allot a second address to said virtual device, wherein said second address is within a cacheable address space of said computer system, wherein said step (b) further comprises steps of:

loading an operating system and a device driver for said virtual device into said computer system; and requesting said operating system to allocate said second address to said device driver, wherein said second address is reserved for said device driver such that said second address is unaddressable by said processor unit; and (c) mapping said first address to said second address, wherein accesses to said first address are forwarded to said second address such that said cacheable address space is accessible by said processor unit in a non-cacheable manner.

13. The method according to claim 12 wherein step (a) further comprises the step of:

(d) reading a set of configuration registers of said computer system, said set of configuration registers for indicating to said computer system that said virtual device is physically coupled to a peripheral bus of said computer system.

14. The method according to claim 13 wherein said set of configuration registers are implemented in a controller hardware of said computer system.

15. The method according to claim 14 wherein said controller hardware comprises a host/peripheral bridge.

16. The method according to claim 13 wherein a base address for defining said first address is stored in said configuration registers.

17. The method according to claim 12 wherein said peripheral bus is a PCI bus.

18. The method according to claim 12 wherein said second address is accessible by a peripheral device without snooping said processor unit.

19. A computer system comprising:

a processor unit;

configuration registers for indicating to said processor unit that a virtual peripheral device is physically coupled to a peripheral bus;

computer memory units including a first set of instructions for instructing said computer system to reserve a cacheable memory region to said virtual peripheral device;

said computer memory units further including a second set of instructions for instructing said computer system to allot a non-cacheable memory region to said virtual peripheral device; and controller unit for mapping said non-cacheable memory region to said cacheable memory region, wherein accesses to said non-cacheable memory region are forwarded to said cacheable memory region such that cacheable memory is accessible by said processor unit in a non-cacheable manner and such that said cacheable memory region is accessible by a peripheral device without snooping said processor unit.

20. The computer system according to claim 19 wherein said computer memory units further comprises:

non-volatile memory units for storing said first set of instructions and for providing said first set of instructions during power-on-self-test of said computer system.

21. The computer system according to claim 19 wherein said configuration registers are implemented in a controller hardware of said computer system.

22. The computer system according to claim 19 wherein said second set of instructions comprise a device driver for said virtual peripheral device.

23. The computer system according to claim 22 wherein said controller unit comprises a host/peripheral bridge.

24. The computer system according to claim 23 wherein said configuration registers are implemented in said host/peripheral bridge.

* * * * *